United States Patent
Schütte et al.

(10) Patent No.: US 12,020,599 B2
(45) Date of Patent: *Jun. 25, 2024

(54) METHOD FOR CODING A CONTAINER AND CODED CONTAINER

(71) Applicant: PACCOR Packaging GmbH, Düsseldorf (DE)

(72) Inventors: Andreas Schütte, Meerbusch (DE); Helmut Ruland, Elsdorf (DE); Nicolas Lorenz, Starnberg (DE)

(73) Assignee: PACCOR Packaging GmbH, Düsseldorf (DE)

(*) Notice: Subject to any disclaimer, the term of this patent is extended or adjusted under 35 U.S.C. 154(b) by 159 days.

This patent is subject to a terminal disclaimer.

(21) Appl. No.: 17/483,801

(22) Filed: Sep. 23, 2021

(65) Prior Publication Data
US 2022/0101758 A1 Mar. 31, 2022

(30) Foreign Application Priority Data
Sep. 28, 2020 (DE) .................... 10 2020 125 230.7

(51) Int. Cl.
*G09F 3/00* (2006.01)
*B29C 33/42* (2006.01)
(Continued)

(52) U.S. Cl.
CPC ........ *G09F 3/0297* (2013.01); *B29C 37/0053* (2013.01); *B29C 51/265* (2013.01);
(Continued)

(58) Field of Classification Search
CPC ............ B29C 51/265; B29C 49/42412; B29C 2791/009; G09F 3/0297; B29L 2031/712
See application file for complete search history.

(56) References Cited

U.S. PATENT DOCUMENTS

| 5,366,791 A | 11/1994 | Carr et al. |
| 2005/0067727 A1 | 3/2005 | Weder |

(Continued)

FOREIGN PATENT DOCUMENTS

| DE | 195 44 973 | 6/1997 |
| DE | 10 2010 023 098 | 12/2011 |

(Continued)

OTHER PUBLICATIONS

Examination Search Report dated Oct. 14, 2022, in Canadian Patent Application No. 3128618, 6 pages.
(Continued)

*Primary Examiner* — Farah Taufiq
*Assistant Examiner* — Timothy G Hemingway
(74) *Attorney, Agent, or Firm* — Lowe Graham Jones PLLC (57) ABSTRACT

The invention relates to a method for coding a dimensionally stable packaging container or an associated component made of a plastics-based and/or paper-based material composition, the packaging container being suitable for storing consumer goods such as food, washing agents, etc., wherein, during a shape-forming process for forming the three-dimensional packaging container or the associated component by means of a shaping tool mold, at least one outer and/or inner side undergoes, in at least one position, a shape-changing treatment acting on its first surface in order to produce at least one three-dimensional code.

11 Claims, 4 Drawing Sheets

(51) Int. Cl.
  *B29C 37/00* (2006.01)
  *B29C 43/02* (2006.01)
  *B29C 45/37* (2006.01)
  *B29C 51/26* (2006.01)
  *B29D 22/00* (2006.01)
  *B29K 23/00* (2006.01)
  *B29L 31/00* (2006.01)
  *B65D 25/20* (2006.01)
  *G09F 3/02* (2006.01)

(52) U.S. Cl.
  CPC .......... *B29D 22/003* (2013.01); *B65D 25/20* (2013.01); *B29C 33/424* (2013.01); *B29C 43/021* (2013.01); *B29C 45/372* (2013.01); *B29K 2023/00* (2013.01); *B29L 2031/712* (2013.01); *G09F 2003/0216* (2013.01); *G09F 2003/0272* (2013.01)

(56) References Cited

U.S. PATENT DOCUMENTS

| | | |
|---|---|---|
| 2008/0302256 A1 | 12/2008 | Hirz |
| 2013/0129872 A1 | 5/2013 | Krueger |
| 2014/0315153 A1 | 10/2014 | Kitching et al. |
| 2016/0070999 A1 | 3/2016 | Pranov et al. |
| 2016/0339495 A1 | 11/2016 | Zeh et al. |
| 2019/0060976 A1 | 2/2019 | Kraetzig et al. |
| 2019/0306385 A1 | 10/2019 | Sharma et al. |
| 2021/0001377 A1 | 1/2021 | Sutton |
| 2021/0101711 A1 | 4/2021 | Brown et al. |
| 2021/0253318 A1* | 8/2021 | Waterman ............ G09F 3/0297 |
| 2022/0027590 A1 | 1/2022 | Sharma et al. |

FOREIGN PATENT DOCUMENTS

| | | |
|---|---|---|
| DE | 10 2011 082 011 | 3/2013 |
| DE | 202018107348 U1 | 2/2019 |
| EP | 0 868 357 | 11/1999 |
| EP | 3 305 498 | 4/2018 |
| WO | 2020/186234 | 9/2020 |
| WO | 2021/167971 | 8/2021 |
| WO | 2022/058588 | 3/2022 |

OTHER PUBLICATIONS

Extended European Search Report dated Feb. 3, 2023, in European Patent Application No. 21 192 410.5, 4 pages.
Extended European Search Report dated Feb. 2, 2022, in European Patent Application No. 21192407.1, 6 pages.
Extended European Search Report dated Feb. 7, 2022, in European Patent Application No. 21192410.5, 7 pages.
1 Office Action dated Dec. 9, 2022, in Canadian Patent Application No. 3128619, 4 pages.
Office Action dated Jul. 13, 2023, in Canada Patent Application No. 3128619, 4 pages.

* cited by examiner

METHOD FOR CODING A CONTAINER AND CODED CONTAINER

PRIORITY CLAIM

This application claims the benefit of priority from Germany Patent Application No. 10 2020 125 230.7, filed Sep. 28, 2020, the contents of which is incorporated herein by reference.

FIELD OF THE INVENTION

The invention relates to a method for coding a container and to a coded container.

BACKGROUND OF THE INVENTION

Containers, in particular packaging containers or associated components, such as a lid, made of plastics-based and/or paper-based material compositions, are known in various ways. Such containers are often used for storing consumer goods, such as food, washing agents, etc. For example, ready meals are housed in such containers made of dimensionally stable material.

In order to provide such packaging containers and their associated components with a code which contains certain information, stickers have often been used previously. Alternatively, printing the packaging container with a barcode is known. Such barcodes have to be attached to the packaging container by means of a separate sticker or with a paper tape surrounding the packaging container at a later point, for example after a thermoforming process of the plastics material or an injection molding process. This is usually complex, since in the case of a printing method the lateral walls are already in their final alignment or have a round surface. Alternatively, printing can take place before shaping, i.e. before a shape-forming process for forming the three-dimensional packaging container or the associated component, but this poses the risk that the printed surface will be damaged during the shaping process for producing the three-dimensional packaging container. For example, in a thermoforming method, when a middle portion of a film-shaped plastics material is drawn into the tool mold, a deformation process would take place in the edge region, i.e. in the transition from the later bottom surface of the packaging container to the lateral wall elements. This deformation process often results in deformation in the edge region at the transition between the bottom surface and the wall elements by up to 90°, in which case a crease-free and smooth deformation should be provided. Due to the material used in each case and the use of a negative or positive tool mold made of durable material, such as metal, there is therefore the risk of a surface change in the region of the later lateral wall element of the packaging container which is used, for example, for serving ready-made salads, cold ready-made meals, vegetable compositions, etc.

However, such codes or barcodes are very desirable in order to allow fast payment by reading out the barcodes. In addition, barcodes of this type can be found only at a specific position for the entire packaging container containing the dish and the associated lid, so that the cashier first has to find this position and then hold it under the barcode scanner. For this purpose, it may also be necessary to tilt the dish or meal together with the packaging container. This is generally not desired. In addition, applied barcodes in the form of tags, labels or packaging sleeves can make identification more difficult and/or impossible by being deformed or torn off.

In addition, such packaging containers made of plastics materials are increasingly posing an environmental problem, since they are often not subject to a specific recycling cycle. Depending on the country and the associated environmental regulations, in particular waste recycling regulations, containers of this type may therefore still find their way into a practiced waste separation, but not into a regulated recycling cycle in which this material from which the packaging container is made is specifically assigned by the relevant manufacturing company to a recycling process for the creation of new containers. Examples of such rigid or stiff and dimensionally stable plastics materials are HDPE, PE, PET, PP, rPET, r-PP and r-PE.

Another disadvantage of the coding of packaging containers in the previous form is that when stickers are used to apply a barcode, these can be pasted over or even exchanged. This is also not desirable, since a price and other data cannot be quickly read out from this coding and there may be a case of fraud when barcodes of this type are exchanged.

There is thus a desire to allow one or more codes to be attached to a packaging container, going beyond the previous printing and sticking methods.

SUMMARY OF THE INVENTION

It is therefore the object of the invention to provide a method for producing and coding packaging containers made of plastics-based and/or paper-based materials, preferably for food storage and/or other consumer goods, as well as such a packaging container and associated components such as a lid, in which method the container, in particular the packaging container and associated components, already becomes a permanent information carrier during production, the information of which carrier can be read out quickly and easily in a targeted manner for a return to a recycling cycle and without the use of additional application or attachment means.

In terms of the method, this object is achieved by the features of claim 1.

An essential point of the invention is that in a method for coding a dimensionally stable packaging container or an associated component made of a plastics-based and/or paper-based material composition, during a shape-forming process for forming the three-dimensional packaging container or the associated component by means of a shaping tool mold, at least one outer and/or inner side undergoes, in at least one position, a shape-changing treatment acting on its first surface in order to produce at least one three-dimensional code. Such packaging containers are preferably suitable for storing consumer goods such as food, washing agents, etc.

Such a method for coding allows the permanent introduction of a code by applying a shape-changing treatment to the surface of the outer side and/or inner side of a packaging container. It is therefore not necessary to rely on a printing method or a sticking method. Rather, according to the invention, a three-dimensional code, such as a barcode or a QR code, is introduced into the surface of the packaging container made of plastics material and/or paper material in such a way that the surface has depressions at this point. A code designed in this way is therefore not readily possible to remove and can be distributed over the entire outer surface of the packaging container, for example, while retaining the original packaging container shape, by adapting to the contour of the packaging container and, during application, being introduced in a distorted manner by a corresponding calculation depending on the geometry of the packaging container in a form that can be read out again using the 3D data of a packaging container. Alternatively, of course, a plurality of QR codes, for example square QR codes, in the form of digital watermarks can be distributed over the surface of the packaging container, so that the packaging container can advantageously be read out from each side.

Such plastics-based and/or paper-based material compositions, which can be, for example, film-shaped, flat plastics materials, which are then formed into the actual three-dimensional packaging container in a thermoforming process, do not have any imprints or stickers before the actual shape-forming process takes place, since these would be damaged by up to 90° during such a process, for example a thermoforming process, due to the pulling downward and a deformation that takes place in the edge region at the transition from the bottom surface to the wall elements and thus cannot remain permanently undamaged on the outer side of the packaging container. Rather, during thermoforming, the packaging container is not only formed in its final shape, but is also provided with the above-mentioned plurality of codes by a single thermoforming process.

In other production methods for dimensionally stable plastics packaging or paper-based packaging, such as injection molding and blow molding processes, the introduction of such a three-dimensional code is advantageously possible and conceivable, provided that a shaping tool mold is used that is able to impress the three-dimensional code into the surface of an outer side and/or inner side of the packaging container.

Therefore, during the production method of a packaging container made of dimensionally stable material, the above-mentioned shape-changing treatment for producing at least one three-dimensional code will not, as with the printed surfaces, involve the risk of damage to the printing surface during a shape-forming process for the formation of the three-dimensional packaging container. It is therefore no longer necessary to subsequently stick on a code. However, instead, a plurality of identical or different codes can be distributed on the surfaces of the packaging container, so that this code can be read out from each side, even if the packaging is already in a destroyed form on a recycling belt and must be recognized by a reading device located there for sorting.

A preceding method step required for the production of at least one or more three-dimensional codes using the shape-changing treatment includes converting data from at least one previously stored two-dimensional code pattern into data of a three-dimensional code pattern by means of a data conversion device. These three-dimensional code patterns are incorporated by means of a laser device into the second surfaces, for example of inner walls and a bottom surface of the tool mold or mold inserts that can be arranged therein. This applies, for example, to thermoforming processes, although such an implementation is conceivable for injection molding processes and blow molding processes. In this so-called further deformation treatment, the second surfaces receive surface depressions and/or elevations in the form of tiny dots or other tiny cross-sectional areas. As an alternative to the laser device, any other contact-free processing methods can be used that allow a shape-changing treatment on the surfaces of outer surfaces or inner surfaces of the three-dimensional packaging container or its associated components, since the tool mold is processed accordingly by these methods or devices.

Accordingly, data from, for example, a two-dimensional barcode, a digital watermark and/or a QR code are converted in such a way that they can be represented in three-dimensional space in order to form corresponding depressions and elevations at the points where previously light and dark area portions of the code were provided in the two-dimensional code pattern. This means, for example, that a dark point in a two-dimensional code pattern within a lateral inner wall or a bottom surface of the tool mold represents a specific depression in the form of a point, whereas a light point of the two-dimensional code pattern represents an elevation or a surface region without a depression in the three-dimensional code pattern on the second surfaces of the outer sides or the lateral wall surfaces or the bottom surface of the tool mold.

A necessary ablation, or melting or engraving of tiny code patterns in the surface of the inner surfaces of the tool mold, which are generally made of metal, or in correspondingly inserted inserts, which are usually also made of metal, takes place by means of a laser device having one or more laser beams. These laser beams can heat the surfaces at points in such a way and optionally carry out an ablation, in particular a melting process, and generate code patterns in a tiny space, for example in a square shape, as known from QR codes, on the second surfaces in three-dimensional form. In a subsequent thermoforming process, the rigid plastics material is pressed against these regions of the tool mold or its inserts in such a way that the pattern of the three-dimensional code is impressed into the plastics material on the outer side of the packaging container and is present in various positions on the outer side of the packaging container due to the multiple use. Such treatment of the surfaces of the tool mold by means of laser beams is not easy to practice and carry out, since there is the risk in laser treatments of this type of causing undesirable elevations in the edge regions of the, for example, hole-like depressions, the shape of which is desired to be that way. Long series of tests by the applicant have shown solutions as to how the elevations and depressions can be processed in order to achieve a constant result in the shaping process and the resulting coding in the long term.

If the production method used to produce dimensionally stable packaging containers or an associated component from plastics-based and/or paper-based material compositions does not use an injection molding method, a blow molding method or the like, but rather a thermoforming method is used in the form of a thermoforming process, the following should be noted:

The thermoforming process can be supported, for example, by underpressure or punches, or even overpressure, in order to ensure the fastest possible deformation of a film-shaped, flat plastics material into a final shape of the actual shell of the packaging container or an associated component.

The code can be applied in identical form as often as required on the wall sides and bottom sides of the packaging container or an associated component in order to thereby distribute the code over the later lateral wall elements or outer wall surfaces or on the first surfaces of the outer sides of the packaging container and also the outer bottom surface. This ensures that the packaging container can be read out quickly and easily from any side, as is necessary, for example, when paying at the cash register. This saves time, as there is no tedious search for a barcode on a packaging sticker.

When using digital watermarks that are attached on the container, invisibly or almost invisibly or also visibly to the observer, it can also be ensured that there is no forgery of a barcode and barcode information since the digital watermark as such is not immediately perceptible. However, such digital watermarks can be easily read by conventional reading devices. In particular, it should be emphasized here that read-out devices that operate and read two-dimensionally are able to read the three-dimensional code applied according to the invention on the outer side of the packaging container.

In order to read out the data of the digital watermark, associated data must be stored, for example in a cloud.

In order to improve the invisibility of the digital watermark, the code pattern applied to the packaging container can be optimized in terms of its resolution and its extent or extension with regard to the elevations that are produced from the depressions of the tool mold or the tool mold inserts, in such a way that it is integrated to a certain extent into the already existing surface roughness of the surface of the outer surfaces of the packaging container or disappears therein and thus becomes invisible. The areal extent of the digital watermark over the entire outer surface, for example a lateral wall surface of the packaging container or a bottom surface, is also advantageous in this case, so that no difference can be seen from a non-coded outer surface of the packaging container. Applying a digital watermark is also conceivable in the corner regions of the packaging container. The rectangular code pattern can thus be digitally adapted or patched to a packaging container contour. The code pattern is thus distorted depending on the geometry of the packaging container contour, as it is adapted to the contour. This can take place, in terms of data technology, by 3D data of the packaging container being used such that the corresponding distortion of the rectangular code pattern for transferring to parts or the entirety of the packaging container is used together with said data in order to adapt to the contour of said container during the data calculation. As a result, when the data of a 2D code is converted into a 3D code pattern, a kind of three-dimensional texture is obtained.

Therefore, first a conversion of data of a two-dimensional code pattern into data of a three-dimensional code pattern takes place and then, during a read-out process, if this is desired, for example as part of a recycling process, a conversion of a three-dimensional code pattern into data of a two-dimensional code pattern is in turn carried out. These data can then in turn be used to cause, for example, selective sorting of these containers having the specific material and the specific manufacturer on a sorting belt. This can even be achieved successfully if the container has already been crumpled or destroyed since, due to the plurality of codes applied to the outer side of the packaging container in many different positions, it is almost always possible to successfully carry out a reading process and conversion into data of a two-dimensional code pattern. As a result, containers from a specific manufacturer that are selectively sorted and have a specific material can be used to produce high-quality recycled material. In such sorting processes, it is also possible to separate or sort food packaging materials from non-food packaging materials in order to bring these back into a material cycle, especially in the case of food packaging materials, and to produce new food packaging therefrom using suitable processing methods.

The use of digital watermarks thus makes it possible that—even if the packaging container ends up destroyed in the waste after use—due to the distribution thereof across the packaging container and the permanent introduction thereof into the packaging container material, i.e. into the rigid plastics material or a paper-based material, recognition for the subsequent recycling process is possible. Here, both the material, such as PP, PE, PET, rPET, etc., as well as the origin, the place of production, the production method, the packaging container content information, the GTIN number, the SKU number, etc. can be read out in order to selectively subject and deliver the packaging container to a specific recycling cycle, for example, so that new containers can then be made from the recycling material using exactly this substance. Readable data contained in the watermark can therefore be used to identify the material and the packaging container or the components thereof per se in order for these to be categorized and sorted accordingly in the recycling method. The data, which can be found in the watermark in the form of a read-out process, allow conclusions to be drawn regarding the company that brought the packaging containers into circulation, which waste company was involved, who was involved in the recycling process, which sorting unit was actively involved and which control bodies were involved during the recycling process, the production process and/or the filling process of the packaging container.

Paper composite pulps and pulp composites and the mixtures thereof are conceivable as paper-based materials.

In addition, the use of digital watermarks can give the buyer or the user information regarding the packaging content and other data on the food manufacturer by simply scanning or reading out a portion of the wall surface of the packaging container or the bottom using a smartphone app.

The above-mentioned depressions in the tool mold or in the surfaces of inserts that are inserted into a tool mold of this type, which depressions are produced in the second shape-changing treatment, are designed as the elevations which are produced in the first shape-changing treatment. In this way, by means of a negative forming effect, the three-dimensional code pattern is transferred to the outer surfaces of the packaging container in multiple forms and possibly in an identical form.

The positions of the plurality of codes are preferably selected in such a way that they are distributed on the outer wall surfaces and/or on an outer bottom surface of the thermoformed packaging container. The digital watermarks consist of square arrangements of small dots, it being possible for the square arrangements to be present in different sizes on the same packaging container. It goes without saying that digital watermarks of this type can have any other type of shape, such as the shape of a circle, a triangle or a rectangle without equal side lengths.

A packaging container or an associated component made of a plastics-based and/or paper-based material composition, which is suitable for storing consumer goods, therefore advantageously has at least one digital watermark on at least one outer side and/or inner side of the packaging container, which watermark, during a shape-forming process for forming the three-dimensional packaging container or the associated component, is applied at at least one position by a shape-changing treatment acting on the surface of the outer and inner sides. This takes place during the above-mentioned shape-forming process for forming the three-dimensional packaging container without delay in the overall process sequence for producing the packaging container at one position or a plurality of positions.

Another decisive factor for the recognizability of a digital watermark on the surface of the outer surfaces of the packaging container is the resolution of the two-dimensional signal data provided for conversion into 3D data, so that more or fewer precisely outlined elevations are created on the outer surfaces of the packaging container.

Further advantageous embodiments can be found in the dependent claims. A preferred embodiment is described below in conjunction with the drawings.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
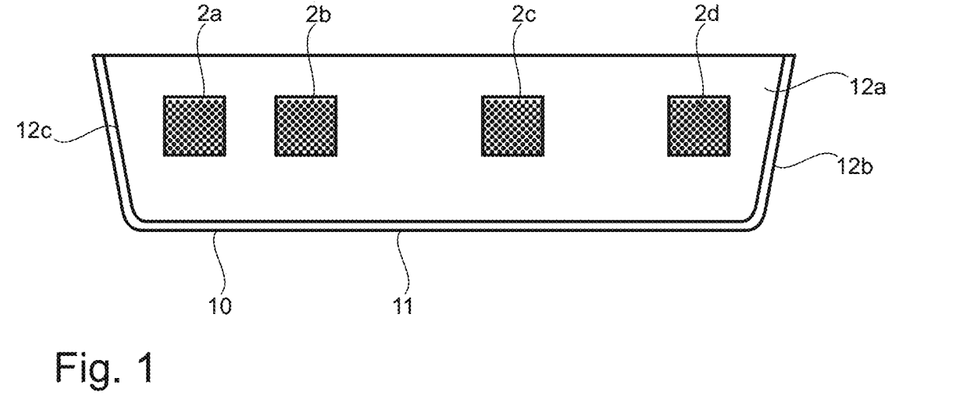
FIG. 1 is a lateral view of the finished packaging container with the coding according to the invention.

In the following, of all possible shape-forming processes for forming the three-dimensional packaging container from plastics-based and/or paper-based material compositions, the thermoforming method for producing a packaging container from a film-shaped or originally planar flat plastics material is examined in more detail in its production process by way of example:

FIG. 1 is a side view of a finished packaging container 10 which is still open in the upper region and could be covered with a lid. This view clearly shows that the almost invisible watermarks 2a, 2b, 2c and 2d are arranged on a lateral front wall surface 12a, or on the outside outer surface. Further watermarks that cannot be shown here are arranged on the right and left lateral wall surfaces 12b and 12c. This also applies to a rear wall surface, which cannot be shown here. Watermarks are also arranged on the outside on a bottom surface 11 of the packaging container 10. These correspond to the watermarks 3a, 3b, as shown, for example, in FIG. 2, which depicts the photograph of an actually produced plastics material container or a packaging container. These square digital watermarks 3a and 3b can be arranged either twice or four times or also multiple times on the bottom region or on the outer side of the bottom surface. This reliably allows reliable, targeted and fast scanning of information from the container.

It can thus be clearly seen from this view according to FIG. 1 that, due to the good distribution of all the digital watermarks, which can have different spacings, it is possible to read out information from any position. This can be done quickly and easily.

Figure 2:
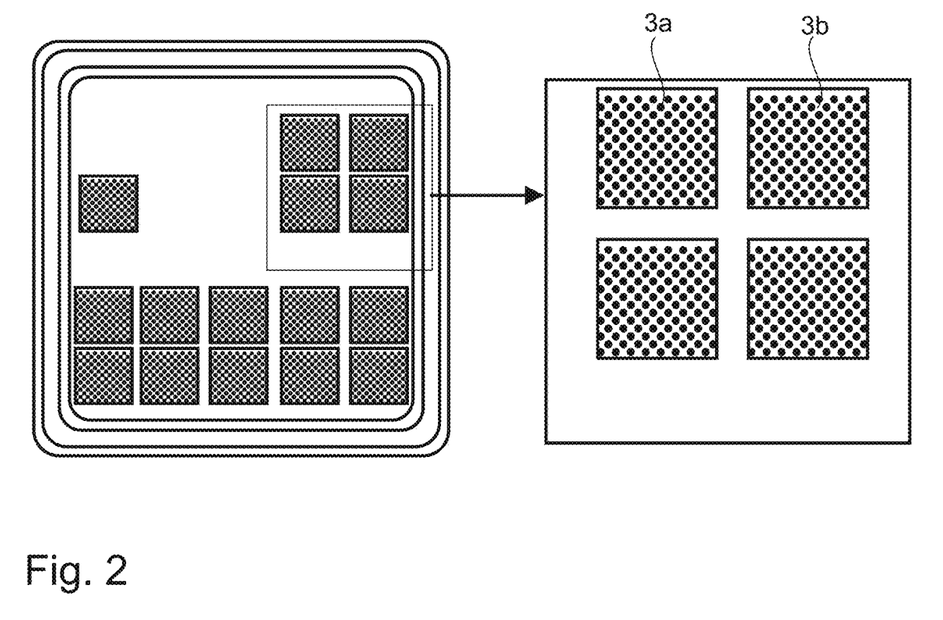
FIG. 2 is the image of a bottom region of the packaging container according to the invention with the coding according to the invention.

The distribution of the watermarks can, for example, be such that a packaging container having a substantially square base shape has square digital watermarks on each lateral wall surface. On its underside, i.e. the bottom surface, there could be two somewhat larger digital watermarks or even four watermarks, as shown in FIG. 2.

The spacing of digital watermarks of this type could be designed, for example, in the lateral wall surface region in such a way that there is only a narrow margin of 2-5 mm between each digital watermark. The watermarks could be arranged in a square shape having an edge length of, for example, 10-30 mm not only next to one another, but also in two or three rows one above the other on the lateral wall surfaces.

Alternatively, instead of distributing individual watermarks over a side wall surface and/or a bottom surface, a full-surface application of the watermarks over an entire side wall surface or an entire bottom surface or simply over all wall and bottom surfaces can also be selected. Depending on the geometry of the packaging, this should be done in such a way that reading out is not impossible, particularly in the edge and corner regions. When the watermark is read out in a recycling system, only a small portion of the total area of the watermark then has to be read out or found by the reading system.

Figure 3:
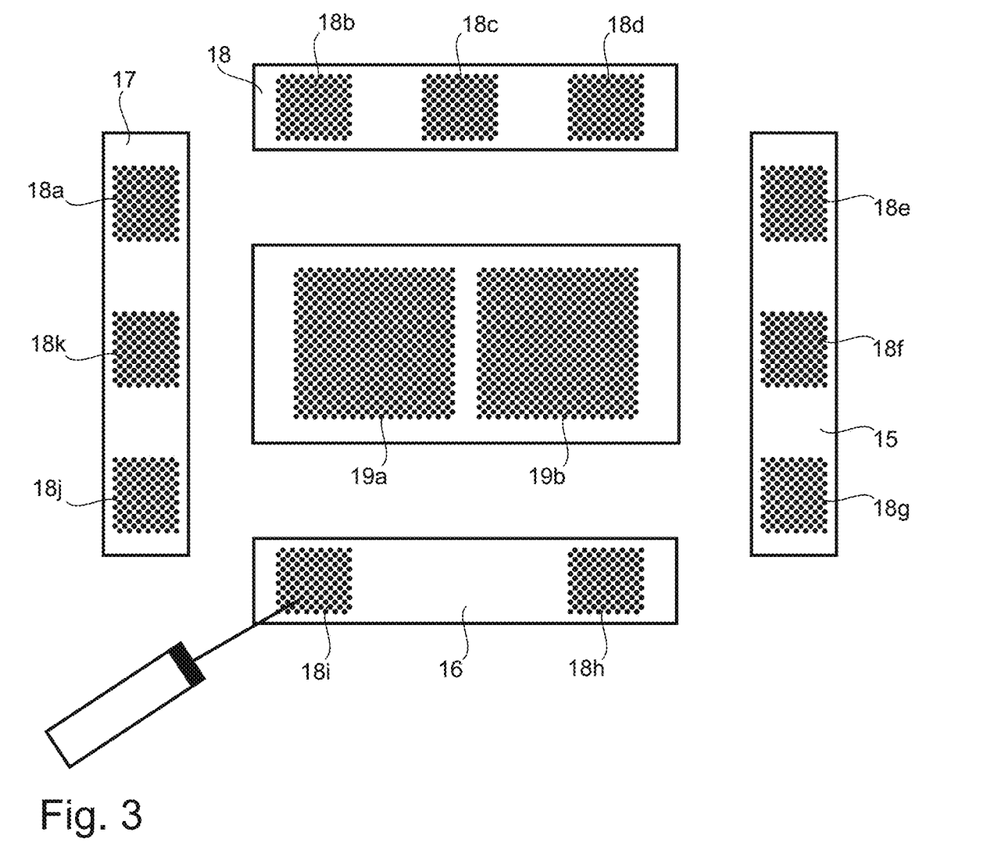
FIG. 3 is a top view of various tool mold inserts for producing three-dimensional codes on the outer surface of a packaging container in accordance with the method according to the invention.

FIG. 3 is a top view of a tool mold insert which has 3D codes 18a-18k applied or incorporated in accordance with the method according to the invention. The tool mold insert is shown in an imaginary opened-out form for a simplified, better view, so that all the inner sides and the inner bottom region can be seen separately from one another in this top view. A laser device 4 having laser beams 4a can be designed in such a way that many small dots are arranged at different locations, for example in the form of a square, these dots containing specific information on the basis of their arrangement position and on the basis of their depth in the material in the region of the surfaces.

Such square codes can be used as a pattern in the tool mold shown here, for example along the lateral wall region, which is formed by the mold insert side surfaces 15, 16, 17 and 18, and are thus later responsible for the lateral wall surfaces of the finished packaging container. These three-dimensional code patterns can be arranged with the same or different spacings and also in different sizes. This is represented by the 3D codes 18a, 18b, 18c, 18d, 18e-k.

Additionally or alternatively, digital watermarks can also be arranged in the region of the later bottom surface of the packaging container. This is achieved in that the mold insert bottom surface 19 assigned to the bottom surface has, for example, incorporated three-dimensional codes 19a and 19b, which in turn can be designed as digital watermarks. These can have, for example, a larger side length of a square in terms of their size than the codes 18a-k. These digital watermarks arranged on the bottom are denoted by the reference signs 19a, 19b.

Figure 4:
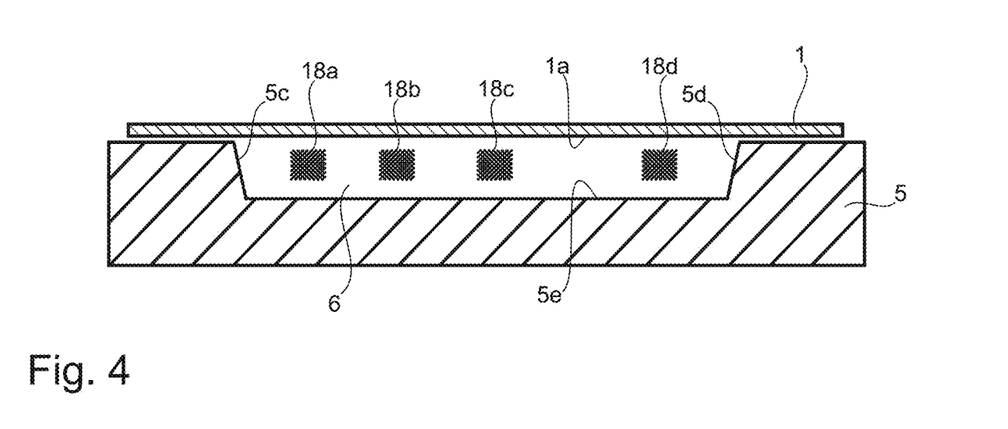
FIG. 4 is a lateral cross-sectional view of a thermoforming mold with the planar flat base material in coded form according to the invention.

FIG. 4 is a cross-sectional view of a thermoforming mold 5 having a negative recess 6, this negative recess 6 representing the outer shape of the packaging container that is to be thermoformed.

The planar flat plastics material is placed with its first side 1a upside down on the thermoforming mold 5.

Figure 5:
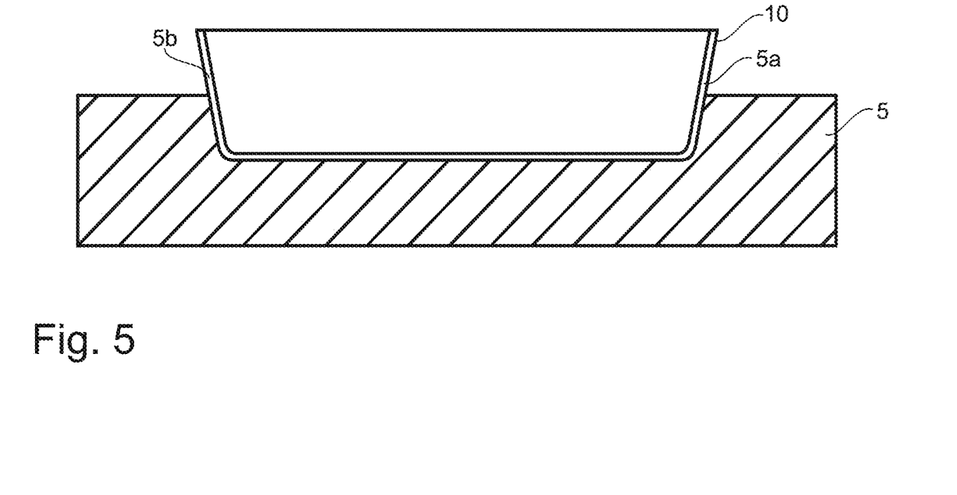
FIG. 5 is a cross-sectional view of the mold with the plastics material in coded form according to the invention.

The actual thermoforming process then takes place, as shown in FIG. 5. Here, the planar plastics material 1 is pressed into the recess 6 of the mold by negative pressure or by overpressure or a punch acting from above, by the material being pulled downwards along the edges 5a and 5b. Care must be taken that the outer surface of the packaging container to be produced is not damaged. During the pulling down or thermoforming of the plastics material 1, the resulting lateral surfaces 12a, 12b, 12c and a bottom surface 11 and optionally other surfaces of the packaging container are pressed against the lateral inner walls of the tool mold at the same time; these walls, as well as the bottom surface of the tool mold, may be provided with mold insert side surfaces and bottom surfaces 15, 16, 17, 18 and 19, as shown in FIG. 3. These mold insert surfaces, in turn, are characterized—as already described—by targeted minimal depressions in the plate material, which can be metal, for displaying the 3D codes. These codes then shape an outer surface of the later packaging container during the thermoforming process in such a way that the code is transferred to the outer surface, but still remains almost invisible due to the small extent in three dimensions into the third dimension.

The inner sides of the tool mold or the mold insert surfaces (not shown here in more detail) within the tool mold are denoted by 5c, 5d and the bottom region by 5e.

Figure 6:
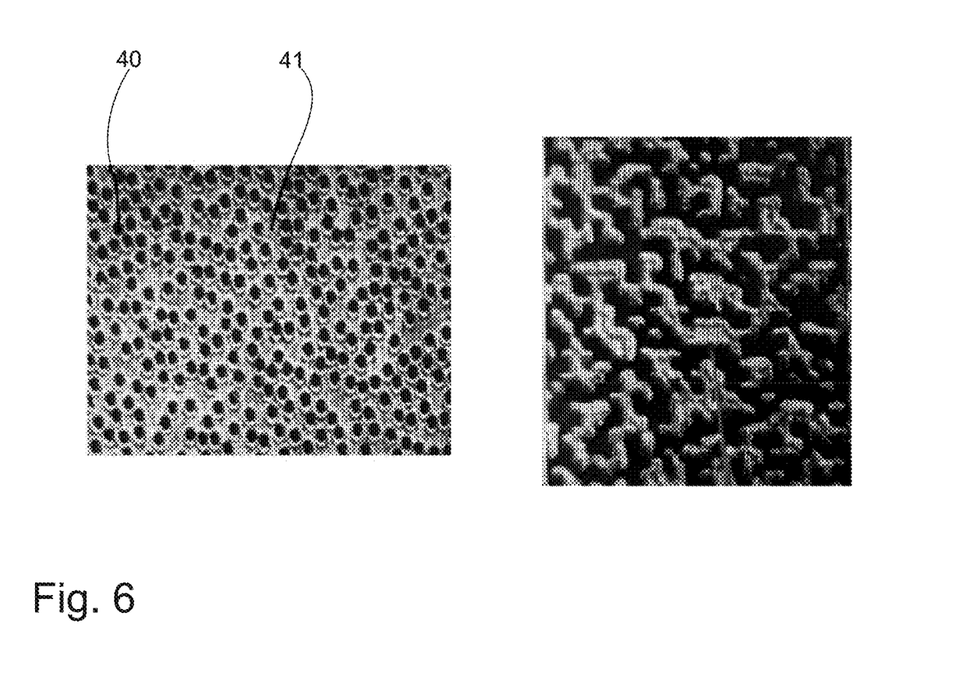
FIG. 6 is a microscope image of a section of a three-dimensional code, as has been introduced or engraved in accordance with the method according to the invention on a surface of the tool mold in the inner region or on the inserts thereof.

FIG. 6 is a microscopic detail view of a region of applied three-dimensional codes on the inside of the tool mold made of metal or on metal inserts that are inserted into the tool mold. It can be seen from this view that there are minimal dot-like depressions 40 having a specific depth, which can be, for example, in the range of 1 µm-50 µm, preferably 5-50 µm. Unchanged regions 41 are present between these punctiform depressions, which regions, in the case of a two-dimensional code, would have to be assigned to the white area portion between black dots.

Since the metal inserts or inner sides of the tool mold themselves now have depressions on their surfaces, the first surfaces of the outer surfaces of the packaging container to be produced, i.e. the lateral wall surfaces and the underside of the packaging container, receive elevations at these points during the subsequent thermoforming process of a plastics material into the tool mold, in order to thus obtain a digital watermark on the first surfaces of the outer surfaces and the bottom surface of the packaging container. Such elevations can move in a range of from 1 to 30 µm. In relation to a total wall thickness of the lateral wall surfaces and also of the bottom surface, these elevations are extremely small and therefore hardly perceptible. This is because usual wall thicknesses, which depend on the geometry of the product, for example the shape of a drinking cup or the shape of a tray, are 250 µm-600 µm, preferably 300 µm-500 µm. In addition, the wall thicknesses depend on the plastics material used and on the position on the outer surface since, during the thermoforming process, the wall thickness in the upper region of the container obtained in this way is usually greater than in the middle region of the side walls. The wall thickness then increases again towards the corner radii of the container. In the lower region, which is adjacent to the bottom surface, as well as in the bottom surface region itself, a wall thickness is provided that is close to the initial thickness of the film-like material, depending on the thermoforming ratio, the punch geometry, the product contour, etc. In addition, the type of digital watermark or digicode can also influence the wall thickness structure with regard to the wall surfaces.

On the right-hand side of this view according to FIG. 6, another possible embodiment of a code, as can be introduced into the metal surfaces by means of a laser device, can also be seen. This form of code is often seen in QR codes.

Figure 7:
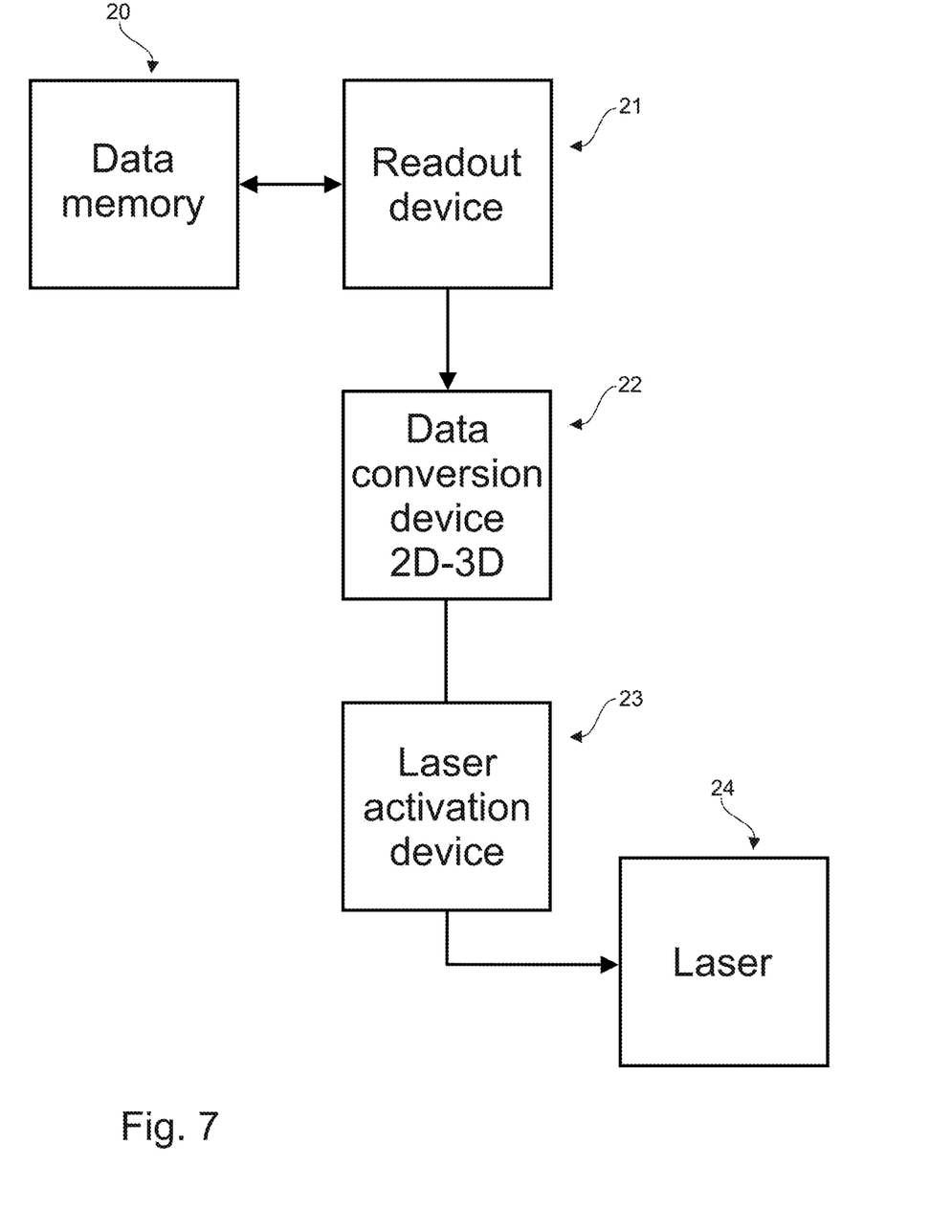
FIG. 7 is a schematic view of various devices for converting and introducing coding data by means of a laser device using the method according to the invention.

In FIG. 7, the conversion of two-dimensional stored code data into three-dimensional code data is shown again briefly in a method sequence, corresponding to the method according to the invention.

Data relating to a two-dimensional code, as generated, for example, by code generating devices, are stored. A read-out device 21 accesses this data memory 20, which device reads out the data from the data memory after the start of a laser treatment process and forwards said data to a data conversion device 22. This is intended to bring about a conversion of the previously available electronic two-dimensional data for a two-dimensional code pattern into data for a three-dimensional code pattern. This means that dark and light regions in the two-dimensional code pattern are converted into area portions of different depths within the surface of a tool mold or associated mold inserts.

A laser activation device 23 then receives an activation command in order to then introduce the data of the three-dimensional code pattern into the surface tool mold or the tool mold inserts by means of a laser device 24.

The coding method according to the invention is also easily possible and conceivable in the application of other production methods of dimensionally stable plastics packaging in which molding tools are used, such as injection molding or blow molding processes. This is because a three-dimensional code can be introduced into a tool mold, for example for the injection blowing process of a packaging container, in a similar manner by means of a laser device, as was described for the thermoforming process described above. Mold inserts can also be used for this purpose. The finished injection-blown product in the form of a packaging container or an associated component, such as a lid, can have on its outer surfaces, for example, a plurality of almost invisible or visible watermarks distributed over the surface, which can be read out with their information at any time, in particular in a sorting process. Even with packaging containers produced in this way, this allows selective sorting as part of a recycling process, so that after a successful sorting process, these packages can be selectively assigned to a recycling process intended for this specific material and this type of packaging and can thus be reused for producing new products. In any case, this ensures that the packaging from a specific manufacturer is always sorted out in a targeted manner, if desired. Even if the packaging were in the destroyed state at a waste disposal station, a read-out device arranged in this region can sort and assign this packaging container, since not only one watermark but a plurality of watermarks are applied to the packaging. There is also no risk that these watermarks have been removed, since neither stick-on watermarks nor printed watermarks have been used.

LIST OF REFERENCE SIGNS

1 Planar flat plastics material
1a Side
2a Three-dimensional codes, digital watermark
2b Three-dimensional codes, digital watermark
2c Three-dimensional codes, digital watermark
2d Three-dimensional codes, digital watermark
3a Three-dimensional codes, digital watermark
3b Three-dimensional codes, digital watermark
4 Laser device
4a Laser beams
5 Tool mold, thermoforming mold
5a Edge
5b Edge
5c Plate insert, mold insert within the tool mold
5d Plate insert, mold insert within the tool mold
5e Tool mold bottom surface
6 Negative recess
10 Packaging container
11 Bottom surface
12a Front lateral wall surface/outer side
12b Right lateral wall surface/outer side
12c Left lateral wall surface/outer side
15 Mold insert side surface
16 Mold insert side surface 17 Mold insert side surface
18 Mold insert side surface
18a Three-dimensional code pattern
18b Three-dimensional code pattern
18c Three-dimensional code pattern
18d Three-dimensional code pattern
18e Three-dimensional code pattern
18f Three-dimensional code pattern
18g Three-dimensional code pattern
18h Three-dimensional code pattern
18i Three-dimensional code pattern
18j Three-dimensional code pattern
18k Three-dimensional code pattern
19 Mold insert bottom surface
19a Digital watermark on the bottom
19b Digital watermark on the bottom
20 Data memory
21 Readout device
22 Data conversion device
23 Laser activation device
24 Laser device
40 Surface depressions
41 Surface elevations While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. Method for coding a dimensionally stable packaging container or an associated component made of a plastics-based and/or paper-based material composition, the packaging container being suitable for storing consumer goods, wherein:
   during a shape-forming process for forming the three-dimensional packaging container or the associated component by means of a shaping tool mold, at least one outer and/or inner side undergoes, in at least one position, a shape-changing treatment acting on a first surface in order to produce at least one three-dimensional code, characterized in that:
   in a preceding method step, data from at least one two-dimensional code pattern are converted into data of a three-dimensional code pattern, taking into account a contour of the packaging container or the associated component, wherein the three-dimensional code pattern incorporates distortions dependent on the geometry of the contour of the packaging container or the associated component;
   wherein the three-dimensional code pattern is incorporated, by means of a laser device, into a second surface of the tool mold or a mold insert that can be arranged therein, in such a way that in a further deformation treatment a surface depression or elevations are contained in the second surface in a form of dots or other cross-sectional areas; and
   the laser device heats the second surfaces at points using one or more laser beams and causes said second surfaces to ablate, in particular to melt.

2. Method according to claim 1, characterized in that:
surface depressions and/or elevations produced during further deformation treatments are designed to correspond to surface depressions and/or elevations produced during the deformation treatment.

3. Method according to claim 1, characterized in that:
surface depressions and/or elevations produced during further deformation treatments are designed to correspond to surface depressions and/or elevations produced during the deformation treatment.

4. Method according to claim 1, characterized in that:
the shape-forming process for forming the three-dimensional packaging container is a thermoforming method, an injection molding method, a blow molding method, or a pressing method for plastics materials, paper compositions, or mixtures thereof.

5. Method according to claim 1, characterized in that:
plastics-based or paper-based material compositions PP, PE, PET, rPET, r-PP, r-PE or paper composites in pressed or unpressed form made of recycled or non-recycled material, such as paper composite pulp and pulp composites or mixtures thereof, are used.

6. Method according to claim 1, characterized in that:
a plurality of three-dimensional codes on the packaging container are a plurality of repetitive, identical digital watermarks, the existence of which is invisible or visible to an observer.

7. Method according to claim 6, characterized in that:
the plurality of three-dimensional codes are positioned in such a way that they are distributed on outer wall surfaces and/or inner wall surfaces and/or on an outer bottom surface of the packaging container.

8. Method according to claim 7, characterized in that:
the digital watermarks each consist, so as to be optionally distorted in a manner adapted to a contour of the packaging container or the component, of square arrangements of distributed dots that are in a two-dimensional view and/or other surface patterns, wherein the square arrangements have different sizes on the same packaging container.

9. Method according to claim 6, characterized in that:
the plurality of digital watermarks are configured to contain coded information regarding the composition of the plastics material used, the production method, packaging container, content information, GTIN numbers, SKU numbers and information, also for further use for an identification method in a sorting, separation and recycling method.

10. Method according to claim 7, characterized in that:
the plurality of digital watermarks are configured to contain coded information regarding the composition of the plastics material used, the production method, packaging container, content information, GTIN numbers, SKU numbers and information, also for further use for an identification method in a sorting, separation and recycling method.

11. Method according to claim 8, characterized in that:
the plurality of digital watermarks are configured to contain coded information regarding the composition of the plastics material used, the production method, packaging container, content information, GTIN numbers, SKU numbers and information, also for further use for an identification method in a sorting, separation and recycling method.

* * * * *